Patented Oct. 27, 1931

1,829,673

UNITED STATES PATENT OFFICE

BERNHARD RICHARD, OF BASEL, SWITZERLAND, ASSIGNOR TO FIRM J. R. GEIGY S. A., OF BASEL, SWITZERLAND

MANUFACTURE OF SUBSTANTIVE POLYAZO-DYESTUFFS

No Drawing. Application filed November 17, 1930, Serial No. 496,337, and in Germany November 29, 1929.

This invention relates to an improvement to or a modification in the manufacture of substantive polyazo-dyestuffs disclosed by the U. S. patent application Ser. No. 496,336 filed November 17, 1930.

In the co-pending application the manufacture of polyazo-dyestuffs consists in coupling the diazo-compound of a disazo-dyestuff of the type:

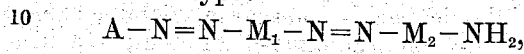

in which A represents the residue of a benzene or naphthalene sulphonic or carboxylic acid and $M_1$ and $M_2$ represent the residue of α-naphthylamine, 1-naphthylamine-6-sulphonic acid, 1-naphthylamine-7-sulphonic acid or a mixture of both of these, with a mono-azo-dyestuff obtainable by coupling in acid solution a diazo-body with 2:5-amino-naphthol-7-monosulphonic acid.

It has been found that likewise precious polyazo-dyestuffs of remarkable fastness to light, but of essentially greener shade can be obtained by coupling a diazo-compound of a disazo dyestuff of the type:

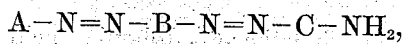

wherein A represents the residue of a benzene or naphthalene derivative, B the residue of α-naphthylamine, 1-naphthylamine-6-sulphonic acid, 1-naphthylamine-7-sulphonic acid or a mixture thereof, and C the residue of a 1-amino-2-naphtholether-6-sulphonic acid, with a monoazo dyestuff obtainable by coupling in acid solution a diazo-body with 2:5-amino-naphthol-7-monosulphonic acid.

The new dyestuffs show a considerable displacement of the shade to green; they yield on cotton directly bluish green tints of excellent fastness to light and are also characterized by a remarkable purity of their tints.

The following example illustrates the invention, the parts being by weight.

17.3 parts of metanilic acid are diazotized and coupled with 24.5 parts of Clève's acid 1:7. The product is diazotized further, the diazo-compound is isolated and then coupled in acetic acid solution with 28.9 parts of 1:2-aminonaphtholethylether-6-sulphonic acid. When coupling is complete the product is further diazotized and the diazo-compound salted out and isolated. This brown violet diazo-compound is made into a paste and introduced at 0° C. into a solution consisting of 150 parts of water, 200 parts of commercial pyridine and 40 parts of ammonia solution of 20 per cent. strength and the dyestuff which is obtainable by acid coupling of 17.3 parts of diazotized metanilic acid with 24 parts of 2:5:7-aminonaphtholsulphonic acid. When this coupling is finished the dyestuff which has separated in a bronze coloured form is isolated and dried. It dyes cotton directly blue green tints very fast to light.

The dyestuff of this example has in free state probably the following formula:

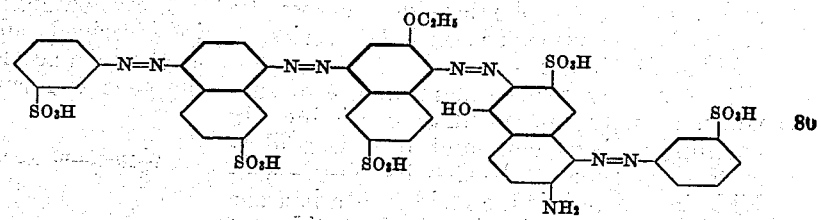

When the dyestuff from aniline-3:6-disulphonic acid, α-naphthylamine and 1-amino-2-naphtholmethylether-6-sulphonic acid is combined with the monoazodye from sulphanilic acid and 2:5-aminonaphthol-7-sulphonic acid coupled in acid solution, a polyazo-dyestuff is obtained which most probably has the formula:

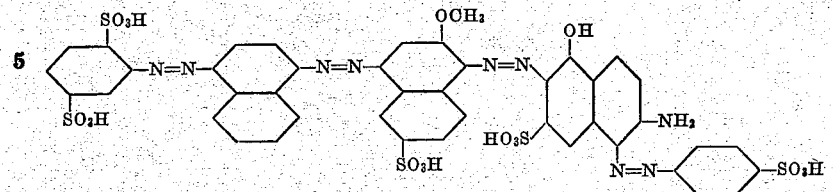

and dyes cotton blue green tints with a somewhat bluer shade than the former dyestuff.

If the dyestuff from aniline-3-sulphonic acid (metanilic acid), 1-naphthylamine-7-sulphonic acid and 1-amino-2-naphtholethylether-6-sulphonic acid is combined with the monoazodye from aniline coupled in acid solution with 2-amino-5-naphthol-7-sulphonic acid, a polyazo-dyestuff is obtained which dyes cotton blue green shades and can be represented by the formula:

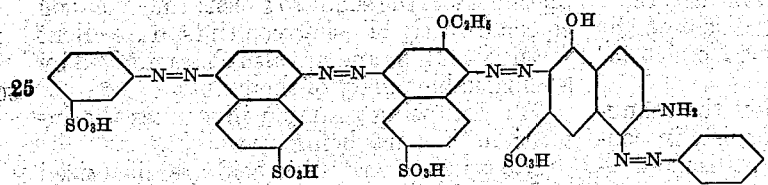

When the dyestuff from aniline, 1-naphthylamine-6-sulphonic acid and 1-amino-2-naphtholmethylether-6-sulphonic acid is combined with the monoazodye from sulphanilic acid coupled in acid solution with 2-amino-5-naphthol-7-sulphonic acid, a polyazo-dyestuff is obtained, which dyes cotton blue green shades and has probably the formula:

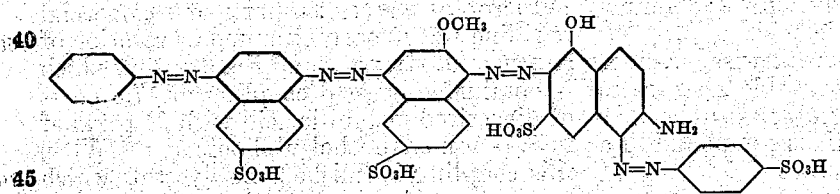

In this manner, instead of the bodies named as initial components and of the diazo-bodies coupled in acid solution with 2:5:7-aminonaphtholsulphonic acid, there may be used any other bases, sulphonic acids or carboxylic acids of the benzene or naphthalene series.

What I claim is:—

1. A process for the manufacture of substantive polyazo-dyestuffs, consisting in coupling a diazo-compound of a disazo-dyestuff of the type A—N=N—B—N=N—C—NH$_2$, in which A is the residue of a benzene or naphthalene derivative, B the residue of α-naphthylamine, 1-naphthylamine-6- or -7-sulphonic acid or a mixture of both of these, and C the residue of a 1:2-aminonaphtholether-6-sulphonic acid, with a mono-azo-dyestuff obtainable by coupling in acid solution a diazo-body of the benzene and naphthalene series with 2:5-aminonaphthol-7-monosulphonic acid.

2. A process for the manufacture of substantive polyazo-dyestuffs, consisting in coupling the diazo-compound from metanilic acid-azo-Clève's acid 1:7-azo-1:2-aminonaphtholether-6-sulphonic acid with the dyestuff obtained by acid coupling of diazotized metanilic acid with 2:5:7-amino-naphtholsulphonic acid.

3. A process for the manufacture of substantive polyazo-dyestuffs, consisting in coupling the dyestuff from aniline-3:6-disulphonic acid-azo-α-naphthylamine-azo-1-amino-2-naphtholether-6-sulphonic acid with the monoazodye obtained in acid solution from sulphanilic acid and 2:5-aminonaphthol-7-sulphonic acid.

4. A process for the manufacture of substantive polyazo-dyestuffs, consisting in coupling the dyestuff from aniline-azo-1-naphthylamine-6-sulphonic acid-azo-1-amino-2-naphtholether-6-sulphonic acid with the monoazodye obtained in acid solution from sulphanilic acid and 2-amino-5-naphthol-7-sulphonic acid.

5. As new article of manufacture, the herein described substantive polyazo-dyestuffs as obtained according to claim 1 and having the general formula:

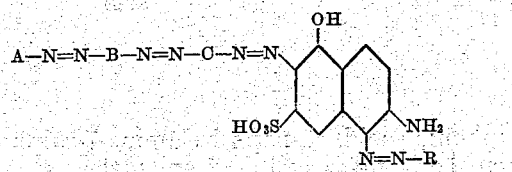

wherein A represents the residue of a benzene or naphthalene derivative, B the residue of α-naphthylamine, 1-naphthylamine-6-sulphonic acid, 1-naphthylamine-7-sulphonic acid or a mixture thereof, and C the residue of a 1-amino-2-naphtholether-6-sulphonic acid, whilst R represents a residue of a benzene or naphthalene derivative, said dyestuffs dyeing cotton blue green tints fast to light.

6. As new article of manufacture, the herein described substantive polyazo-dyestuff as obtained according to claim 2 and having probably the formula:

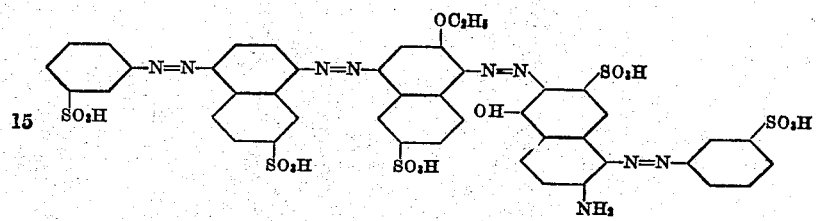

said dyestuff dyeing cotton blue green tints fast to light.

7. As new article of manufacture, the herein described substantive polyazo-dyestuff as obtained according to claim 3 and having probably the formula:

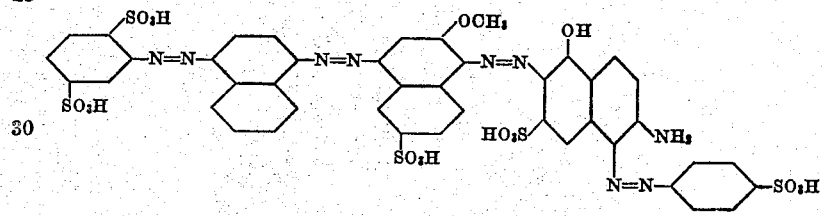

said dyestuff dyeing cotton blue green tints fast to light.

8. As new article of manufacture, the herein described substantive polyazo-dyestuff as obtained according to claim 4 and having probably the formula:

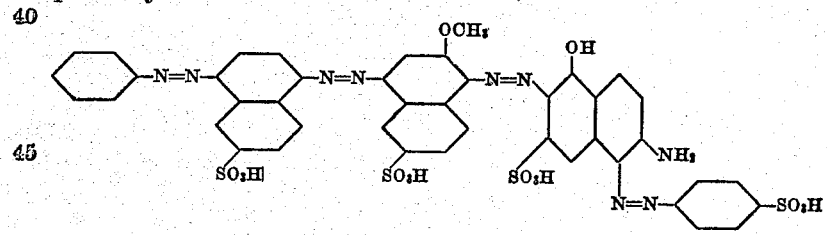

said dyestuff dyeing cotton blue green tints fast to light.

In witness whereof I have hereunto signed my name this 6th day of November, 1930.

BERNHARD RICHARD.